United States Patent
Rödbro et al.

(10) Patent No.: US 10,057,151 B2
(45) Date of Patent: *Aug. 21, 2018

(54) ESTIMATING BANDWIDTH IN A NETWORK

(71) Applicant: Microsoft Technology Licensing, LLC, Redmond, WA (US)

(72) Inventors: Christoffer Asgaard Rödbro, Stockholm (SE); Philip A. Chou, Bellevue, WA (US); Urun Dogan, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/235,862

(22) Filed: Aug. 12, 2016

(65) Prior Publication Data

US 2016/0352606 A1 Dec. 1, 2016

Related U.S. Application Data

(63) Continuation of application No. 14/454,618, filed on Aug. 7, 2014, now Pat. No. 9,444,714.

(51) Int. Cl.
*H04L 12/26* (2006.01)
*H04L 12/801* (2013.01)
*H04L 12/24* (2006.01)

(52) U.S. Cl.
CPC ........ *H04L 43/0888* (2013.01); *H04L 41/142* (2013.01); *H04L 41/145* (2013.01);
(Continued)

(58) Field of Classification Search
CPC ......... H04L 45/02; H04L 45/04; H04L 45/10; H04L 12/5602; H04L 47/27;
(Continued)

(56) References Cited

U.S. PATENT DOCUMENTS

| | | | |
|---|---|---|---|
| 6,314,093 B1 * | 11/2001 | Mann | ...................... H04L 45/12 370/254 |
| 7,315,514 B2 | 1/2008 | Heiner et al. | |

(Continued)

OTHER PUBLICATIONS

"International Preliminary Report on Patentability", Application No. PCT/US2015/043891, dated Jul. 6, 2016, 8 pages.

(Continued)

*Primary Examiner* — Brenda H Pham

(57) ABSTRACT

A method comprising: collecting respective observations of end-end bandwidth experienced on different occasions by multiple past communications occurring over different respective observed paths over a network, each path comprising a respective plurality of network components; modelling each of the respective network components with a bandwidth probability function characterized by one or more parameters; and estimating a component bandwidth or component bandwidth probability density for each of the network components based on the modelling, by determining respective values for said parameters such that a combination of the component bandwidths or bandwidth probability densities for the network components in the observed paths approximately matches, according to an optimization process, the observations of the end-to-end bandwidth experienced by the past communications over the observed paths.

20 Claims, 4 Drawing Sheets

(52) U.S. Cl.
CPC ........ *H04L 41/147* (2013.01); *H04L 43/0852* (2013.01); *H04L 43/0894* (2013.01); *H04L 47/18* (2013.01)

(58) Field of Classification Search
CPC ..... H04L 2012/5635; H04L 2012/5636; H04L 2012/5632; H04L 47/10; H04L 43/0888; H04L 43/0852; H04L 47/18; H04L 41/142; H04L 41/145; H04L 41/147; H04L 43/0894
USPC ....... 370/351, 231, 232, 235, 238, 252, 253, 370/395.2, 395.21, 395.32, 395.41, 400, 370/401, 349, 328, 310.2, 338
See application file for complete search history.

(56) References Cited

U.S. PATENT DOCUMENTS

| | | | |
|---|---|---|---|
| 7,616,585 | B1 | 11/2009 | Kritov et al. |
| 7,680,036 | B2 | 3/2010 | Yang et al. |
| 7,688,739 | B2 | 3/2010 | Frei et al. |
| 7,895,333 | B2 | 2/2011 | Elliott, Jr. et al. |
| 7,911,962 | B2 * | 3/2011 | Khuu .................. H04L 45/125 370/238 |
| 8,189,489 | B2 | 5/2012 | Zhang et al. |
| 8,650,289 | B2 | 2/2014 | Pantos et al. |
| 8,724,503 | B2 | 5/2014 | Johnsson et al. |
| 8,787,400 | B1 | 7/2014 | Barth et al. |
| 9,444,714 | B2 * | 9/2016 | Rodbro ............... H04L 43/0852 |
| 2011/0292803 | A1 * | 12/2011 | Nishioka ............... H04L 1/0003 370/236 |
| 2014/0269332 | A1 * | 9/2014 | Senarath ............... H04L 47/125 370/238 |
| 2016/0043925 | A1 | 2/2016 | Rödbro et al. |

OTHER PUBLICATIONS

"International Search Report and Written Opinion", Application No. PCT/US2015/043891, dated Oct. 16, 2015, 12 pages.

"Non-Final Office Action", U.S. Appl. No. 14/454,618, dated Nov. 30, 2015, 16 pages.

"Notice of Allowance", U.S. Appl. No. 14/454,618, dated May 6, 2016, 8 pages.

Anjali,"A New Path Selection Algorithm for MPLS Networks Based on Available Bandwidth Estimation", In Proceedings: Second International Workshop on Internet Charging and QoS Technologies, Oct. 16, 2002, 10 Pages.

Castro,"Network Tomography Recent Developments", In Proceedings: Statistical Science, vol. 9, No. 3, Mar. 7, 2003, 44 Pages.

Dinwoodie,"Statistical Estimation of Internal Available Bandwidth", In Proceedings: Journal of Statistical Computation and Simulation, vol. 78, No. 7, Apr. 23, 2007, 21 Pages.

Ekelin,"Real-Time Measurement of the End-to-End Available Bandwidth using Kalman Filtering", In Proceedings: The 10th IEEE/IFIP Network Operations and Management Symposium, Apr. 3, 2006, 12 Pages.

Goldoni,"Assolo, a New Method for Available Bandwidth Estimation", In Proceedings: Fourth International Conference on Internet Monitoring and Protection, May 24, 2009, 7 Pages.

Jain,"End-to-End Available Bandwidth: Measurement Methodology, Dynamics, and Relation with TCP Thoroughput", Computer Communication Review, ACM, New York, NY 32(4):295-308 (2002), 2002, 14 pages.

Jain,"Path Selection using Available Bandwidth Estimation in Overlay-based Video Streaming", Advances in Communication Networking, May 14, 2007, 12 pages.

Kanuparthy,"Pythia: Detection, Localization, and Diagnosis of Performance Problems", In Proceedings: IEEE Communications Magazine, vol. 51, Issue 1, Nov. 2013, 9 pages.

Melander,"A new End-to-End Probing and Analysis Method for Estimation Bandwidth Bottlenecks", In Proceedings of IEEE Global Telecommunications Conference, vol. 1, Nov. 27, 2000, 6 Pages.

Ribeiro,"PathChirp: Efficient Available Bandwidth Estimation for Network Paths", In Proceedings of 4th Passive and Active Measurement Workshop, Apr. 6, 2002, 11 Pages.

Song,"Real-time End-to-end Network Monitoring in Large Distributed Systems", In Proceeding: 2nd International Conference on Communication Systems Software and Middleware, Jan. 7, 2007, 10 Pages.

Thouin,"Multi-path Probabilistic Available Bandwidth Estimation through Bayesian Active Learning", Cornell University Library, Jan. 7, 2010, 12 pages.

Wang,"QoSaaS: Quality of Service as a Service", In Proceedings: The 11th USENIX conference on Hot topics in management of internet, cloud, and enterprise networks and services, Mar. 29, 2011, 6 Pages.

Zarifzadeh,"Range Tomography: Combining the Practicality of Boolean Tomography with the Resolution of Analog Tomography", In Proceedings: The 12th ACM SIGCOMM conference on Internet measurement conference, Nov. 14, 2012, 13 pages.

"Supplemental Notice of Allowance", U.S. Appl. No. 14/454,618, dated Aug. 15, 2016, 2 pages.

* cited by examiner

Figure 3
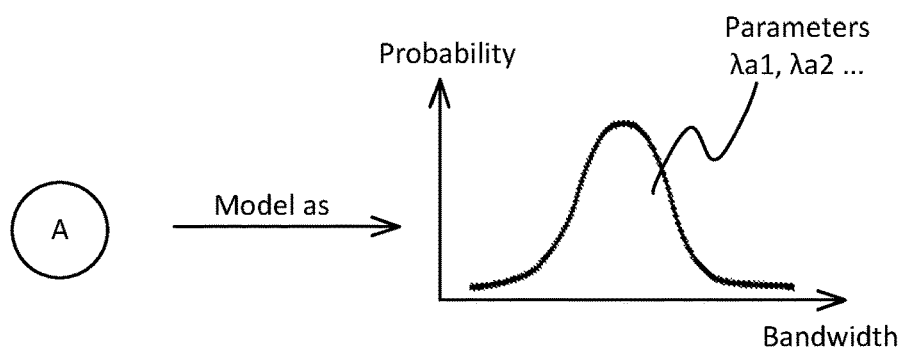
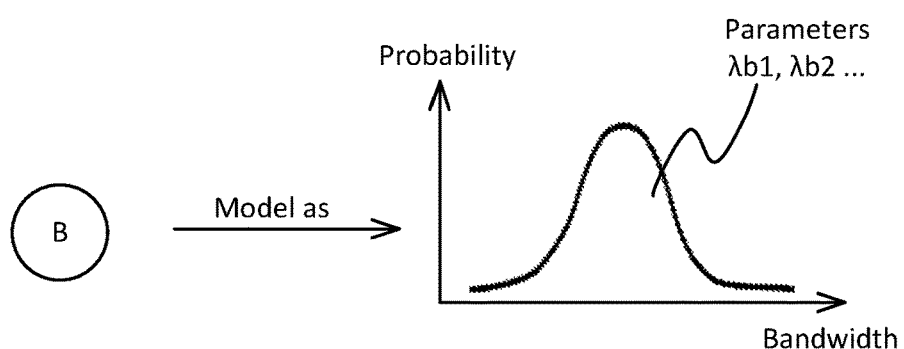
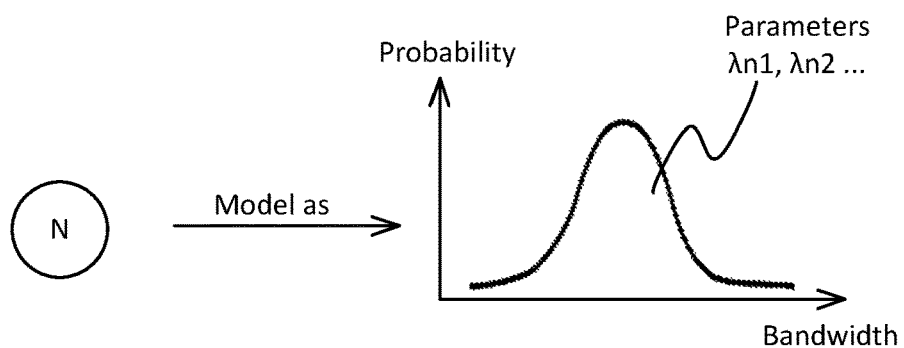

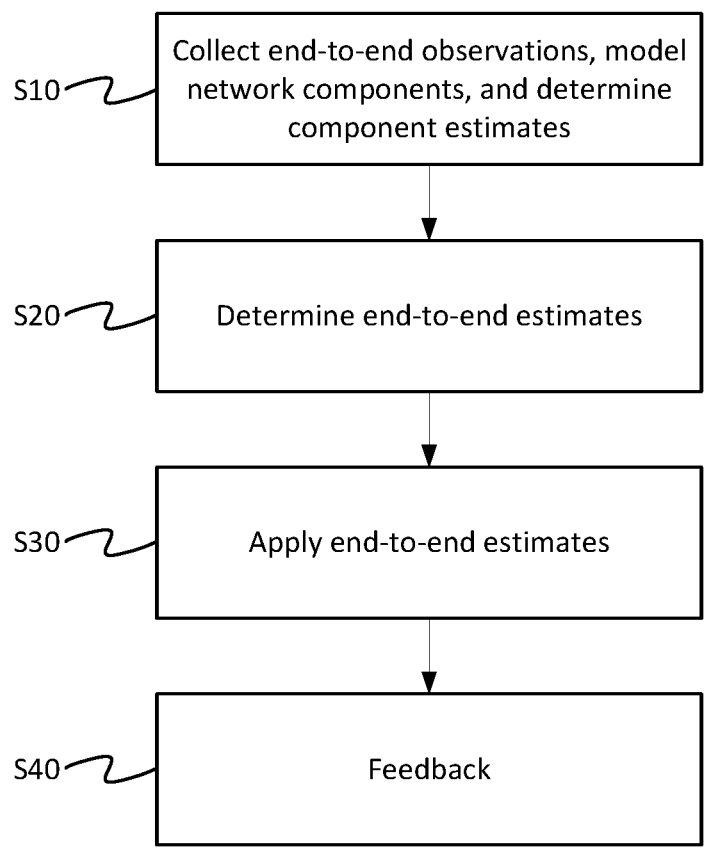

ESTIMATING BANDWIDTH IN A NETWORK

PRIORITY

This application is a continuation of and claims priority to U.S. patent application Ser. No. 14/454,618 entitled "Estimating Bandwidth in a Network" and filed Aug. 7, 2014, the disclosure of which is incorporated by reference herein in its entirety.

BACKGROUND

In the context of a computer network such as the Internet, the bandwidth of a network path or a component of a path (e.g. a server, relay or router) may refer to either the bandwidth capacity or the available bandwidth of the path or component. The bandwidth capacity is the total data rate the path or component can handle, while the available bandwidth is the data rate which that path or component can currently offer (the bandwidth capacity minus any bandwidth incurred by existing communications over the path or through the component). Bandwidth may be expressed for example in terms of bits per second, or bytes per second.

Existing methods allow for the estimation of the bandwidth over a given network path, but only based on observations previously made on the exact same network path (comprising the exact same constituent components). For example, one can build a histogram of previously observed bandwidths. However these methods can only estimate the bandwidth of a path if there was a previous observation for that path. In fact, quite a few observations on the exact same network path are typically required in order to get a useful estimate. Often, no observations exist for the path in question, and thus the methods break down completely. Also, without visibility of individual constituent components of a path, these methods do not allow for estimating the bandwidth of the individual components of the path (e.g. individual servers, relays or routers).

More sophisticated methods exist for estimating jitter, round-trip time (RTT) and packet loss rather than bandwidth. However, it is not straight-forward to extend such methods to bandwidth, because of the unique property of bandwidth that the bandwidth of a path is equal to the bandwidth of the lowest bandwidth component on the path, i.e. the "bottleneck" (whereas for jitter, RTT and packet loss, these are determined by the cumulative effect of each component along the route).

SUMMARY

The bandwidth of an individual network component may be of interest in its own right, e.g. for the purposes of network planning. Alternatively or additionally, knowledge of individual component bandwidths would allow the bandwidth of any arbitrary path to be determined regardless of whether that path has been experienced previously (i.e. regardless of whether a bandwidth measurement has yet been obtained for that path as part of the method or model in question).

For example, when administering a large network with multiple components such as servers and data centres involved it can be very challenging to detect which of them are bottlenecks. Thus, an estimate of the bandwidth provisioned by each such network component would be useful. For example, if a certain component such as a server is identified as a bottleneck, a network administrator may buy some more bandwidth for it, or modify a routing policy of the network to place less burden on that server or other component, or even upgrade the network topology to add additional components.

As another example, when starting a media session over a network path, it may be useful to provide an estimate of the bandwidth provided by that path, e.g. which can be used to decide the appropriate encoding level of the media (and therefore what bandwidth it will incur). In yet another example, an application such as a VoIP application running on a user terminal may have options to choose between different network paths, e.g. by connecting to different servers or relays, or by using different network interfaces at the user terminal. In this case, the application may want to choose the network path that matches its needs the best. One factor that could be used to make this decision is an estimate of the end-to-end bandwidth for the possible paths.

Thus there are a number of reasons why it may be desirable to be able to estimate the bandwidth of individual components in a network, or to estimate the bandwidth of a path for which no bandwidth observation has (necessarily) been obtained previously. Further, it would be desirable if such knowledge could be obtained without (necessarily) having visibility of individual components.

According to one aspect disclosed herein, there is provided a method of estimating bandwidth information for individual network components based on end-to-end observations of past communications, in embodiments without any observations of the component bandwidths being available. The method begins by collecting respective observations of end-end bandwidth experienced by multiple past communications on different occasions occurring over different respective observed paths over a network such as the Internet. In embodiments, the observed compunctions comprise user communications comprise actual user communications conducted between user terminals of multiple different users (as opposed to artificial test communications), and the observations are collected by receiving reports from at least one application running on the user terminals of the multiple different users. For example, this may comprise collecting reports of the bandwidth experienced during voice and/or video calls, as measured by instances of a communication client application such as a VoIP client running on various user terminals throughout the network. In embodiments, the method is implemented at a server which collects the observations from many different user terminals. Alternatively however, the method could be implemented on an individual user terminal based on its own observations and/or observations shared from other users. Also, the method is not limited to observations of voice and/or video calls, and could alternatively or additionally use other types of communications such as one-way media streams and/or file transfers.

Note also that the observations are collected from communications conducted on multiple different occasions (different discrete times in the past), e.g. from different calls conducted by different users over a period of multiple hours, days, weeks, months or even years. The method does not require simultaneous measurements to be taken of the different paths. Further, the observations are collected from a mesh of different paths. The method does not necessarily require the measurements to be taken from any particular structured combination of paths, e.g. does not require simultaneously or systematically probing a tree with test communications.

Whatever communications are being observed, each communication travels over a path comprising a respective plurality of network components. Note the term "network component" or the like, as used herein, may refer to any node capable of forming part of a path from one end-point to another over network (e.g. from a sending to a receiving user terminal). For instance, a network component modelled according to the present disclosure may comprise an individual router (e.g. Internet router), relay, bridge, gateway or server unit, or a particular logical server (comprising multiple server units), a particular data centre, an autonomous system having a particular autonomous system number (ASN), or geographical meta information (e.g. continent, country, state, or city). The modelled components may also comprise one or more the end-points themselves, e.g. use terminals.

To estimate the component bandwidth information, the method comprises modelling each of the respective network components with a bandwidth probability function characterized by one or more parameters; and estimating a component bandwidth or component bandwidth probability density for each of the network components based on said modelling. This is done by determining respective values for said parameters such that a combination of the component bandwidths or bandwidth probability densities for the network components in the observed paths approximately matches, according to an optimization process (e.g. a Maximum Likelihood Estimation), the observations of the end-to-end bandwidth experienced by the past communications over the observed paths.

Thus it is possible to estimate information about the bandwidth of individual nodes in the network based on observations of end-to-end bandwidth along previously observed paths (and in embodiments only based on observations of end-to-end bandwidth), without necessarily needing to be able to directly observe the bandwidth statistics of individual nodes along such paths.

Note that the disclosed technique can be applied to estimating either available bandwidth or bandwidth capacity. If the method is fed with end-to-end estimates of available bandwidth, it will return estimates of the "available bandwidth" of the components. If fed with end-to-end capacity estimates, it will return estimates of the capacity of the components.

In embodiments, the method may further comprise predicting an end-to-end bandwidth or end-to-end bandwidth probability density of a target path over said network, based on the component bandwidths or bandwidth probability densities of a plurality of constituent ones of said network components. The target path need not necessarily be included amongst the observed paths (though it could happen to be). N.B. the "target" path here means a subject path, i.e. a path that is the focus of attention, or the path in question. It does not necessarily imply the path is aimed for or sought after in any way (though that is not excluded either).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

BRIEF DESCRIPTION OF THE DRAWINGS

To assist understanding of the present disclosure and to show how embodiments may be put into effect, reference will be made by way of example to the accompanying drawings in which:

FIG. 3 schematically illustrates a method for modelling components of a network, and FIG. 4 is a flow chart of a method for estimating bandwidth.

DETAILED DESCRIPTION OF PREFERRED EMBODIMENTS

Figure 1:
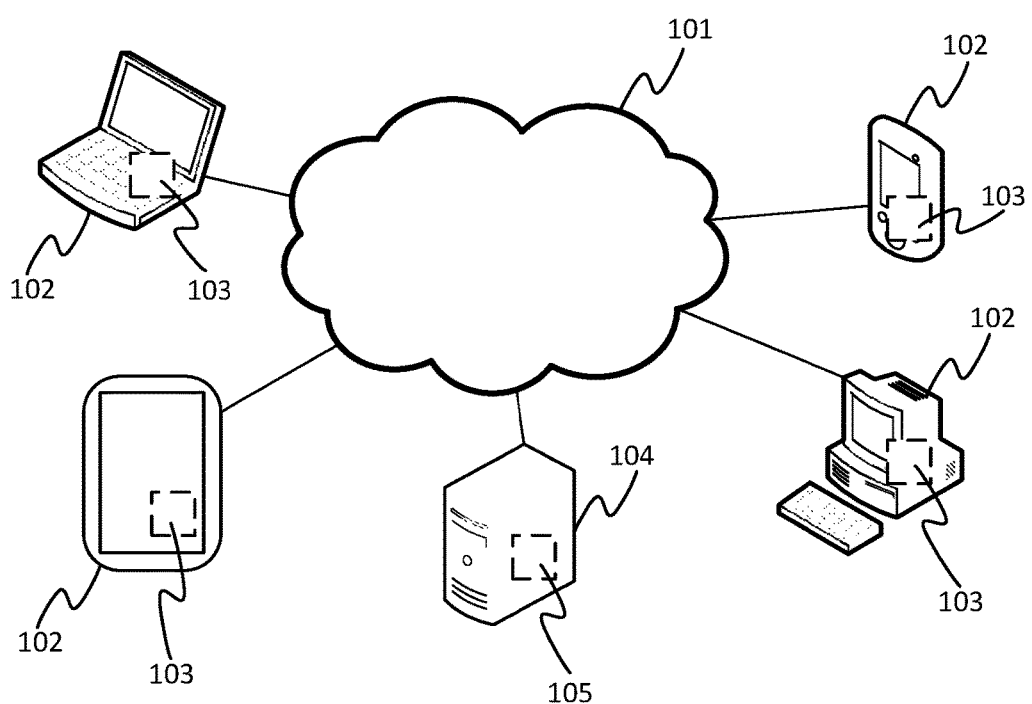
FIG. 1 is a schematic diagram of a communication network.

FIG. 1 illustrates a communication system comprising a network 101, e.g. a public wide area internetwork such as the Internet, or a private wide area network such as a company intranet. Connected to the network 101 are a plurality of communication end-points in the form of user terminals 102, such as desktop computers, laptop computers, tablets and/or smartphones. Each of the user terminals 102 is installed with a respective instance of a communication client application 103 for communicating with one or more others of the user terminals 102 over the network 101. In embodiments, the communication client 103 is a voice and/or video calling client such as a VoIP client for conducting live voice and/or video calls between user terminals 102 over the network 101. Also connected to the network 101 is a server 104 providing a bandwidth estimation service 105. This server 104 may be implemented as a single server unit, or a logical server comprising more than one server unit over one or more sites.

Figure 2:
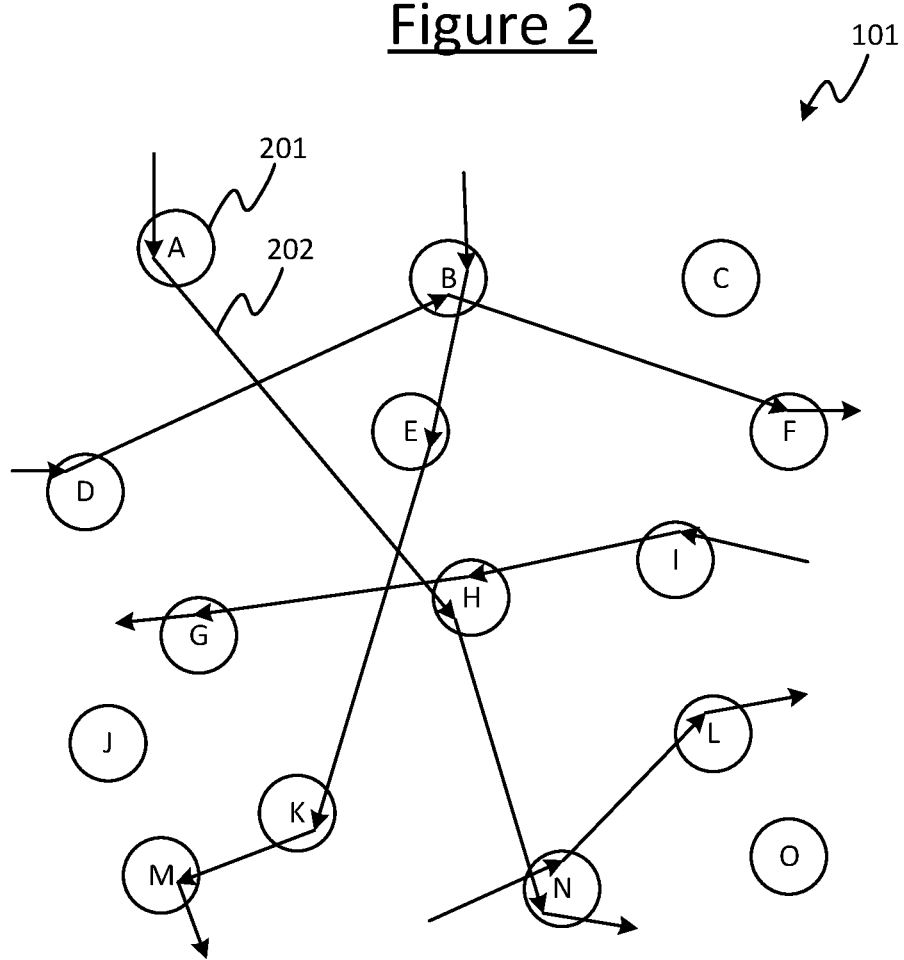
FIG. 2 is a schematic diagram showing components of a communication network.

FIG. 2 illustrates more detail of the communication network 101. The network 101 comprises a plurality of network components 201, i.e. nodes of the network. In the figure, the individual network components 201 are labelled A . . . O for reference, though it will be appreciated that in embodiments many more components 201 may be present than illustrated. Each of these components 201 may represent one of various types of network node, such as a router, a relay (e.g. a peer in a P2P system), a bridge, a gateway, a server unit, a logical server, a data centre, an ASN of a particular autonomous system, or geographical meta information (e.g. a particular city, state, country or continent). Further, the various components 201 considered in the following model may be nodes of the same type, or may include nodes of different types.

When the communication client 103 on one user-terminal 102 sends a communication to a complementary instance of the communication client 103 on another of the user terminals 102 (e.g. sends an audio stream and/or video stream as part of a call), the communication will travel over a certain path 202 over the network made up of a plurality of the network components 201. For instance in the illustrated example, a transmitting user terminal 102 sends a communication (e.g. audio and/or video stream) that travels first via network component A, then via network component H, then finally via network component N which delivers the communication to a receiving user terminal 102. Thus the communication may be described as travelling over a network path AHN between two end-points 102. Note that the communication may be an ongoing stream flowing over the path, and does not have to be transmitted in its entirety to one component A before it begins to be transferred onwards to the next component H, etc. I.e. while an earlier part of the stream is being transferred to the destination end-point 102 from component N, a later part of the stream is being transferred from component H to component N, and a still later part of the stream is being is being transferred from component A to component N, etc.

Also illustrated in FIG. 2 are network paths BEKM (from component B to E to K to M), DBF (from component D to B to F), IHG (from component I to H to G) and NL (from component N to L). For example each may comprise a different respective audio and/or video stream of a respective voice and/or video call conducted between various end-points 102, e.g. between various instances of a VoIP client 103 over the Internet. Note that the paths need not necessarily contain the same number of network components. Also, note how some or all of the network components may be involved in different paths. E.g. component H is a component of path AHN and path IHG, and component B is a component of path BEKM and path DBF, while component N is a component of path AHN and path NL. In practice there would likely be a much larger number of paths overlapping in a much more inter-woven mesh, but FIG. 2 is simplified for illustrative purposes.

Each path 202 has a certain bandwidth, i.e. the bandwidth capacity, or the available data rate it presently has going spare. The bandwidth is in general determined by the slowest component 201 on the path 202, i.e. the "bottleneck". I.e. the end-to-end bandwidth of a path 202 may be modelled as the minimum bandwidth of any component 201 on the path.

Although the client application 103 cannot see into the path 202 and so cannot see which component 201 is the bottleneck, many communication clients such as VoIP clients have the facility to estimate the end-to-end bandwidth on a particular connection over which they are communicating, i.e. a particular path. Various methods of measuring the bandwidth experienced over a given connection will in themselves be familiar to a person skilled in the art. For example, pathChirp, Pathload, or TCP friendly Rate Control (TFRC) may be used to measure end-to-end available bandwidth; or packet train methods may be used to measure end-to-end bandwidth capacity.

Furthermore, it is often possible to identify which components make up the path. For example, in one model, each path is considered to consist of only two components, e.g. an autonomous system through which the user-terminal 102 at one end of the path connects to the network 101, and another autonomous system through which the user-terminal 102 at the other end of the path connects to the network 101. An autonomous system is a collection of IP routing prefixes that presents a common, defined routing policy to the Internet, e.g. being the system of a given internet service provider (ISP). Each autonomous system is identified by a unique ASN (autonomous system number). Thus in embodiments, each path can be modelled as comprising only a respective pair of ASNs. Another example would be to consider the path to consist of two geographic locations at either end of the communication, e.g. the country or city at either end (in which case the components may be modelled by the geographic meta information of the two endpoints)

Further, if the communication traverses a server, relay or data centre, the identity of that component may be known to the application 103 and thus in embodiments it may readily be added to the path as a component.

More generally, it is possible to discover the components of other, more complex paths by using other known techniques, such as performing a trace route. A trace route is performed by sending a trace packet from one of the end-points 102 addressed to the other, with the trace packet containing a time-to-live (TTL) value set to a non-zero integer value. When a network component 201 receives the packet, it decrements the TTL value and then either forwards the trace packet to the next network component 201 in the path if the TTL is still non-zero, or otherwise if the TTL value has now been decremented to zero the network components responds with an identification of itself to the sending terminal 102. The first trace packet the sent by the sending terminal TTL is initially set to 1, so it is decremented to 0 after the first hop a the first network component it reaches (e.g. A), which then responds with its identity. The sending terminal 102 then sends a second trace packet with the TTL set to 2. This second trace packet will therefore travel two hops, reaching the second network component in the route (e.g. H) by the time it is decremented to zero, causing the second network component to respond with its identity, and so forth.

Techniques for identifying network paths will in themselves be familiar to a person skilled in the art, and the scope of present disclosure is not limited to any particular technique. Note also, a path as considered for the purpose of the modelling disclosed herein does not necessarily have to include every component along the path down to the minutest detail—if for the purposes in question a component is generally fast enough compared to the other components that it can be assumed not to be a bottleneck, it can be ignored when modelling the path.

Given the huge amount of calls or other communications typically conducted in a communication system such as a VoIP system, it is possible to collect statistics on a large number of calls over a period of time, including the bandwidth experienced and an identification of the network components 201 making up the traveled path 202. In accordance with the following there is provided a method to estimate the bandwidth limitations introduced by individual network components, or the probability distribution of the bandwidth, provisioned by each such network component 201 based on multiple end-to-end bandwidth observations.

These component estimates may in themselves have an application to network planning.

Alternatively or additionally, given these estimates, it is also possible to combine the individual component estimates into estimates of end-to-end bandwidth of any new path across the components 201—even if an observation of a path consisting of that exact combination of network components has not previously been incorporated into the model. This may be applied for example to media encoding or network path selection, as will be discussed in more detail shortly. Both the component estimate and estimates of new paths are based on a model that end-to-end bandwidth is determined by the minimum bandwidth of any component on the path ("the bottleneck").

The disclosed method is now discussed in more detail with reference to FIG. 4.

In a first step S10, multiple end-to-end bandwidth observations across multiple network components are collected, preferably at a server 104. The observations are collected over a period of time, e.g. multiple hours, days, weeks, months or even years. When the communication client 103 running on one of the user terminals 102 performs a communication (e.g. call) over the network 101, it also makes an observation by measuring the bandwidth experienced over the respective path 202 and identifying the components 201 of the respective path, as discussed above. Over multiple communications performed by multiple user terminals 102 on various different occasions, each client 103 reports its measured bandwidth and identified path to the bandwidth estimation service 105 running on the server 104 (e.g. over the same network 101 or a separate medium).

At the bandwidth estimation service 105, the observations are processed to identify the bandwidths provided by each of the individual network components 201 present. Because the bandwidth provided by different components may vary over time due to e.g. side load, it is preferable to model the component bandwidths by their probability density functions. This can apply to either available bandwidth or bandwidth capacity. Available bandwidth varies over time due to varying demand. It may be impacted by competing applications running in the same user device, and/or different user devices. Further, depending on the definition of capacity, bandwidth capacity can also be time varying. For example if capacity is the peak rate as measured by packet train drain rate, it may be time varying in networks such as mobile networks, because it is assigned by the operator as a function of various technical parameters (e.g. signal quality, user load, etc.).

Over time, the bandwidth estimation service 105 will have collected observations many different paths 202 comprising many different combinations of network components 201, many of which different paths 202 will contain some but not all of the same network components 201. Based on this, it is possible for the bandwidth estimation service 105 to estimate the bandwidth (e.g. mean bandwidth) or at least the bandwidth probability density of the individual network components 201 even though it only has observations of end-to-end bandwidth. Some specific examples of how this is done are detailed later in relation to Equations (1) to (31), but an outline of the process is set out as follows, and also in relation to FIG. 3.

(a) Firstly, a generic likelihood function is derived for the observation data. This is based on the model that the observed end-to-end bandwidth is determined by the slowest network component 201 on the path.

(b) Each network component 201 that was involved in any of the observed paths 202 is then modelled with a probability distribution function. This is illustrated schematically in FIG. 3. N.B. a likelihood function $p(y;\lambda)$ is a function of the parameters $\lambda$ for fixed observations y; while a probability density function $p(y;\lambda)$ is a function of the observations y for fixed parameters $\lambda$. Sometimes, the parameters $\lambda$ are implicit. That is, p(y;lambda) is sometimes just written as p(y), with lambda being understood. One can pick any probability distribution function (PDF) for the component bandwidths, e.g. exponential, Gaussian, Weibull, or discretized probability mass functions (PMF) ("histograms"). Whichever is chosen, the probability distribution function is characterized by one or more parameters, which can take different values for the different network components 201. E.g. in FIG. 3 the parameters of the PDF modelling component A are labelled $\lambda a1, \lambda a2 \ldots$, the parameters of the PDF modelling component A are labelled $\lambda b1, \lambda b2 \ldots$, etc. In embodiments, the same type of PDF is used for every component 201 being modelled in a given model, or alternatively it is not excluded that different types of PDF could be used to different components 201 within a given model.

(c) The task now becomes an optimization problem in the parameters of the chosen PDF type or types. That is, it is desired to find values for the parameters of the PDFs modelling the different network components 201, such that a model all the paths considered together based on the component model PDFs approximately matches (e.g. most closely matches) the actual observations of those paths. In embodiments, this means it is desired to find values for the parameters of the PDFs modelling the different network components 201, such that they in combination yield the highest possible likelihood product of all the end-to-end bandwidth observations that were actually observed on the end-to-end paths. This principle is known as maximum likelihood estimation. For instance, in the case of Gaussian PDF type, it is desired to find the means and variances that leads to the highest likelihood product of the end-to-end bandwidth observations. This can be achieved using any known optimization method to maximize the likelihood function formed in step (a) above. In embodiments, the optimization method used may be a convex optimization method, e.g. an interior point method such as Newton's method, which if required can be extended with log-barriers to keep parameters within restricted ranges. Alternatively, non-convex methods such as genetic algorithms may be applied, or convex and non-convex methods may be used in combination; e.g. a convex method can be initialized with the result of a non-convex method.

(d) The result is a PDF for each network component 201 with solved parameters, giving the probability density of the respective network component.

In embodiments, the "histogram" PDF type may be used as it can fit any data and also results in an optimization criterion that can be solved using convex optimization methods and therefore executes in reasonable time. In embodiments, Tikhonov regularization terms may be added to the optimization criteria as this protects against overfitting. For instance, for the histogram PDF type, a term may be added to the objective penalizing differentials in the PDF, leading to PDF smoothing. This can also provide the additional effect that the objective can still be optimized without numerical breakdown in the case where any network component is not observable due to linear dependencies in the observation set.

In some embodiments, the bandwidths may optionally be pre-processed with an invertible compressor such as the log-function. The bandwidth PDFs modelled by each component will then actually model the log-bandwidths delivered by each component. The resulting end-to-end bandwidth estimates can then be recovered by taking the exponential of the bandwidth prediction made in the log domain. This is can be useful because bandwidths tend to be long tailed distributions and therefore compression increases modelling accuracy. Moreover, this is consistent with the effect of modelling accuracy: while there is a big quality difference between a 100 and a 200 kbps video call, there is virtually no difference between a 2000 and a 2100 kbps video.

A second, optional step S20 is to provide an estimate of the bandwidth or bandwidth PDF of a certain target end-to-end path, which may be a path that was not included in the observations collected and modelled in the first step S10. The second step S20 is carried out after the first step S10 but not necessarily directly triggered in response to finishing the first step S10. Rather, in embodiments, step S20 will be invoked when an application (see step S30) requests an estimate of the bandwidth (or the PDF of the bandwidth) of an end-to-end path, e.g. which it intends to use for a communication or is considering using. E.g. the communication client application 103 may wish to determine an estimated bandwidth for making a voice or video call. The application 103 sends a request to the bandwidth estimation service 105, in which it provides the service 105 with the identities of the network components 201 on the path in question (the "target path"). For example, the application may run a trace route on the target path, or the components may be deduced from the endpoints (e.g. the ASN or country at either side plus any server or relay in between). The network component PDFs estimated in step S10 are then combined into a new PDF of the end-to-end bandwidth of the provided network path, or the PDFs are used to generate a most probable bandwidth. The combination of the PDFs is based on a model that the end-to-end bandwidth is determined by the slowest component on the path.

In embodiments, the combination is performed by the bandwidth estimation service 105, and the service 105 provides the resulting bandwidth or bandwidth probability density of the target path to the requesting application, e.g. the communication client application 103 on one of the respective user terminals 102, or a media streaming application running on a server. The application then uses this as a prediction of the bandwidth or bandwidth probability density experienced by a subsequent communication conducted by the application over the target path.

Alternatively, the service 105 may provide the individual component bandwidth or bandwidth probability densities of one or more of the network components to the application, for the application to use to combine into the predicted bandwidth or bandwidth probability density for the target path at the user terminal 102. E.g. in embodiments, the service 105 may supply the application with the component bandwidths of all components on the target path, or may supply only the PDFs of problematic low bandwidth components.

In a third, optional step S30, the estimated end-to-end bandwidth or bandwidth PDF is applied for a practical purpose. Example applications are as follows. In a first exemplary application, the predicted end-to-end bandwidth or end-to-end bandwidth probability function of the target path is used to select a property of a subsequent communication being transmitted or to be transmitted over the target path, the selection of this property affecting a bandwidth incurred by the subsequent communication over the target path. In embodiments this selection comprises selecting between different quality versions of the subsequent communication, such as different quality modes of an audio or video codec. For instance, this may be used for bandwidth selection in media streaming, e.g. a video streaming service may choose between different levels of quality based on the provided estimate. As another example, this may be used for bandwidth selection in real time communications. As another example, a VoIP service may choose between different levels of quality based on the provided estimate. Such a service will typically run its own "in service" bandwidth estimation based on the transmitted media data, but even in this case the bandwidth estimates provided by the methods described here may be useful in the initial phase, before the "in service" estimate becomes available or stabilizes.

In a second exemplary application, the estimates may be used for network path selection. In this case, the method comprises predicting a respective end-to-end bandwidth or end-to-end bandwidth probability density of each of two or more different target paths over the network, each based on the component bandwidths or bandwidth probability densities of a respective plurality of constituent ones of said network components. A comparison of the predicted end-to-end bandwidths or end-to-end bandwidth probability densities of the two or more target paths is then used to select one of the target paths for transmitting a subsequent communication. For instance, an application (any of the above) may query end-to-end bandwidth estimates for multiple paths and then select the fastest or otherwise "best" path for a session. As an example, the choice may be between using a slow and cheap or a fast an expensive server. If there is a third slow network component on the path to both servers, there is no advantage of choosing the fast and expensive server, as the slow server will not be a bottleneck anyway (provided it is faster than the third slow component).

Note, in the above it is assumed the bandwidth estimate is provided to the application (e.g. the application 103 on one of the user terminals 102) and the application makes the path selection, or the selection of the quality or other property of the communication affecting the incurred bandwidth. However, in alternative embodiments, an indication of the selection is provided to the application (e.g. on the user terminal 102) to conduct the subsequent communication over the selected target path or with the selected quality or other property.

In yet another exemplary application, the component bandwidths or bandwidth probability densities of one or more of the network components are used for network planning, by modifying the network based on the component bandwidths or bandwidth probability densities of the one or more of the network components. E.g. by direct inspection of the network component bandwidths (the outcome of step S10) any administrator can readily detect which components tend to be bottlenecks. Thus he or she can act on that information and possibly provision accordingly.

It will be appreciated that the above applications are only examples, and the skilled person may find other useful applications for estimating the bandwidth or bandwidth probability density of network components or paths comprising such components.

Note also that in the bandwidth estimate produced by the above methods (e.g. by the service 105), the resulting bandwidth estimate of a target component or path may be output in terms of an estimated bandwidth probability density distribution or a single representative bandwidth estimate (e.g. an estimated average bandwidth such as an estimated mean or modal bandwidth). To determine an estimated distribution, each of the respective network components is modelled with a bandwidth probability function characterized by not just one, but at least two independently variable parameters. In embodiments, outputting the estimated probability density provides more options for exploiting the estimate. For instance, in selecting a path for subsequent communication, the service 105 or application 103 may base the selection on both the average bandwidth (e.g. mean or peak bandwidth of the distribution) and a measure of the spread of the bandwidth probability density distribution (e.g. a width defined between +/−X % of the peak of the distribution). For example, one target path under consideration may have a higher estimated average bandwidth but a wider spread, meaning the bandwidth is less reliable; whilst another target path may have a lower estimated average bandwidth, but a narrower spread, meaning the bandwidth is more reliable. In some scenarios, the service 105 or application 103 may select the more reliable path over the path with the higher estimated average, while in other scenarios the service 105 or application 103 may select the path with the higher estimated average over the more reliable path. E.g. the selection may depend on the requirements of the subsequent communication for which the selection is being made, such as its media type (file transfer, audio, video, etc.) and/or minimum guaranteed bitrate required.

Further, in any of the applications listed above the bandwidth related estimates may be combined with estimates or measurements of other factors such as round-trip time (RTT), packet loss, jitter, or monetary cost before making the final appropriate decisions.

In a fourth, optional step S40 the application (e.g. communication client 103 or media streaming application) may send back to the service 105 the actual "in-session" bandwidth estimate (when available) observed during the actual communications. This observation then provides additional information, and step S10 can be reinitiated to refine the network component bandwidth PDF estimates.

In yet further optional embodiments, the disclosed method may allow for predicting different bandwidth estimates for different times of day. This can be achieved by segmenting the day into periods such as 0:00-6:00, 6:00-12:00, 12:00-18:00, 18:00-24:00 and applying the disclosed technique separately in each period. Alternatively, the time of day can be embedded into the modelled network component. For example, each ASN can be modelled as four network components corresponding to the four time intervals exemplified above.

Some examples of probability density functions for modelling each network component 201 (step S10) are now described. In the examples below, Equation (4) is the likelihood function, and $p_j(X_j)$ is the probability density function of component j. Two specific examples are given. The working up Equation (11) is generic to both examples. In the working up to Equation (11), the parameter to be varied in the optimization is represented by $\theta_j$. In the specific example of Equation (16), k is used to represent a generic parameter for all components and then $k_j$ is used to let k vary for each component. In Equation (22) it is $p_j(k)$. N.B. the k in (16) is not the k in (22).

For the purpose of the following, the different network components are indexed by j. When a component is on the end-to-end path of a call it introduces a bandwidth limitation $x_j$. Now assume that this bandwidth limitation is a random variable with density function $p_j(X_j)$. Now denote the $i^{th}$ end-to-end observation by $y_i$. This is also a random variable with density function $p_i(Y_i)$. Because the end-to-end bandwidth is determined by the "weakest link", it can be expressed that:

$$yi = \frac{\min(x_j)}{j \in A_i} \quad (1)$$

where $A_i$ is the set of network components on the path for the $i^{th}$ end-to-end observation.

$p_i(y_i)$ will now be derived. That is, the likelihood for the yi observation. First one needs the probability that component j delivers a bandwidth high enough to yield $y_i$:

$$P_{ij}(X_j \geq y_i) = \int_{y_i}^{\infty} p_j(X_j) dX_j \quad (2)$$

Now the probability that all components deliver a high enough bandwidth is:

$$P_i(Y_i \geq y_i) = \Pi_{j \in A_i} \int_{y_i}^{\infty} p_j(X_j) dX_j \quad (3)$$

Now one gets back to the likelihood function by:

$$p_i(y_i) = \quad (4)$$

$$\frac{d}{dy_i} P_i(Y_i \leq y_i) = \frac{d}{dy_i}(1 - P_i(Y_i \geq y_i)) = -\frac{d}{dy_i} \prod_{j \in A_i} \int_{y_i}^{\infty} p_j(X_j) dX_j y_i$$

For the whole set of observations y the likelihood thus becomes:

$$p(y) = \prod_i -\frac{d}{dy_i} \prod_{j \in A_i} \int_{y_i}^{\infty} p_j(X_j) dX_j \quad (5)$$

As what is of interested is finding the underlying density functions $p_j(X_j)$ that maximizes p(y), one can take the logarithm on both sides to arrive at the log likelihood function:

$$\log p(y) = \sum_i \log\left(-\frac{d}{dy_i} \prod_{j \in A_i} \int_{y_i}^{\infty} p_j(X_j) dX_j\right) \quad (6)$$

In relation to this term, now note that:

$$\frac{d}{dy_i} \log \prod_{j \in A_i} \int_{y_i}^{\infty} p_j(X_j) dX_j = \frac{\frac{d}{dy_i} \log \prod_{j \in A_i} \int_{y_i}^{\infty} p_j(X_j) dX_j}{\prod_{j \in A_i} \int_{y_i}^{\infty} p_j(X_j) dX_j} \quad (7)$$

Thus one can re-write:

$$\log p(y) = \quad (8)$$

$$\sum_i \log\left(-\prod_{j \in A_i} \int_{y_i}^{\infty} p_j(X_j) dX_j \cdot \frac{d}{dy_i} \log \prod_{j \in A_i} \int_{y_i}^{\infty} p_j(X_j) dX_j\right)$$

$$= \sum_i \sum_{j \in A_i} \log \int_{y_i}^{\infty} p_j(X_j) dX_j + \quad (9)$$

$$\sum_i \log - \sum_{j \in A_i} \frac{d}{dy_i} \log \int_{y_i}^{\infty} p_j(X_j) dX_j$$

$$= \sum_i \sum_{j \in A_i} \log \int_{y_i}^{\infty} p_j(X_j) dX_j + \sum_i \log \sum_{j \in A_i} \frac{p_j(y_i)}{\int_{y_i}^{\infty} p_j(X_j) dX_j} \quad (10)$$

This provides a generic utility to optimize for any given choice of distribution $p_j(X_j)$. On one hand, it is desired to provide a distribution that leads to a convex utility so that can be maximized readily. On the other hand, it is desired to provide a distribution that fits the data and is useful for the applications we have in mind. A distribution that matches the first desire is the exponential:

$$p_j(y_i) = \theta_j e^{-\theta_j y_i}, \theta_j > 0 \quad (11)$$

$$\int_{y_i}^{\infty} p_j(X_j) dX_j = e^{-\theta_j y_i} \quad (12)$$

(and it may also be specified that $y_i >= 0$). Inserted in (10), this gives:

$$\log p(y) = -\Sigma_i \Sigma_{j \in A_i} \theta_j y_i + \Sigma_i \log \Sigma_{j \in A_i} \theta_j \quad (13)$$

and which is concave by inspection: a linear function is both convex and concave, and a concave, non-decreasing function ($\log(\cdot)$) of a concave function ($\Sigma_{j \in A_i} \theta_j$ is concave. Thus a solver can be written to recover $\theta_j$ using Newton's method. The $\theta_j > 0$ constraint can be enforced by adding a log-barrier to the objective function.

However, the exponential distribution does not really fit the second desire mentioned above, because it is a long-tailed distribution with maximum at 0. That means that it can only reflect the capabilities of a component to sometimes support a high bandwidth, but it can reflect nothing relating to how reliable this is. One way of getting around this problem is to use the more general Weibull distribution:

$$p_j(y_i) = k\theta_j^k y_i^{k-1} e^{-\theta_j^k y_i^k}, \ \theta_j > 0 \tag{14}$$

$$\int_{y_i}^{\infty} p_j(X_j) dX_j = e^{-\theta_j^k y_i^k} \tag{15}$$

with shape parameter $k>0$. It can be seen that for $k=1$ it reduces to the exponential distribution, and for $k=2$ one has the Rayleigh distribution. By insertion into (10) one gets:

$$\log p(y) = -\Sigma_i \Sigma_{j \in A_i} \theta_j^k y_i^k + \Sigma_i \log \Sigma_{j \in A_i} k y_i^{k-1} \theta_j^k \tag{16}$$

By the same arguments as made for the exponential distribution this is concave in $\theta_j^k$ for any given k, and thus readily solvable.

Using the Weibull distribution with e.g. $k=5$ ensures that the maximum of the distribution is no longer at 0; however, with fixed k one still has the issue that the mean and variance are 1:1 coupled. One way to get around that is to also let k be a free parameter for each distribution, that is, replace k by $k_j$ above.

Following on from the above, an example of using the Weibull distribution is now described.

The 1st and 2nd order derivatives of (16) can be derived, when replacing k by $k_j$. The first order derivatives are:

$$\frac{d \log p(y)}{d\theta_m} = \sum_i I(m \in A_i) k_m y_i^{k_m} \theta_m^{k_m-1} \left( \frac{k_m}{\sum_{j \in A_i} k_j \theta_j^{k_j} y_i^{k_j}} - 1 \right) \tag{17}$$

$$\frac{d \log p(y)}{dk_m} = \sum_i I(m \in A_i) \theta_m^{k_m} y_i^{k_m} \left( \frac{1 + k_m \log(\theta_m y_i)}{\sum_{j \in A_i} k_j \theta_j^{k_j} y_i^{k_j}} - \log(\theta_m y_i) \right) \tag{18}$$

where $I(\cdot)$ is the indicator function. To build the Hessian one also needs the 2nd order derivatives:

$$\frac{d^2 \log p(y)}{d\theta_m d\theta_n} = \tag{19}$$

$$\sum_i I(m \in A_i) \left( I(n=m) k_m (k_m-1) \theta_m^{k_m-2} y_i^{k_m} \left( \frac{k_m}{\sum_{j \in A_i} k_j \theta_j^{k_j} y_i^{k_j}} - 1 \right) - \right.$$

$$\left. I(n \in A_i) \frac{k_n^2 k_m^2 y_i^{k_n+k_m} \theta_n^{k_n-1} \theta_m^{k_m-1}}{\left( \sum_{j \in A_i} k_j \theta_j^{k_j} y_i^{k_j} \right)^2} \right)$$

$$\frac{d^2 \log p(y)}{dk_m dk_n} = \sum_i I(m \in A_i) \tag{20}$$

$$\left( I(n=m) \theta_m^{k_m} y_i^{k_m} \log(\theta_m y_i) \left( \frac{2 + k_m \log(\theta_m y_i)}{\sum_{j \in A_i} k_j \theta_j^{k_j} y_i^{k_j}} - \log(\theta_m y_i) \right) - \right.$$

$$\left. I(n \in A_i) \frac{(\theta_n y_i)^{k_n} (\theta_m y_i)^{k_m} (1 + k_m \log(\theta_m y_i))(1 + k_n \log(\theta_n y_i))}{\left( \sum_{j \in A_i} k_j \theta_j^{k_j} y_i^{k_j} \right)^2} \right)$$

and finally the cross term:

$$\frac{d^2 \log p(y)}{d\theta_m dk_n} = \sum_i I(m \in A_i) \tag{21}$$

$$\left( I(n=m) y_i^{k_m} \theta_m^{k_m-1} \left( \frac{k_m(2 + k_m \log(y_i \theta_m))}{\sum_{j \in A_i} k_j \theta_j^{k_j} y_i^{k_j}} - k_m \log(y_i \theta_m) - 1 \right) - \right.$$

$$\left. I(n \in A_i) \frac{k_m^2 y_i^{k_m+k_n} \theta_n^{k_n} (1 + k_n \log(\theta_n y_i))}{\left( \sum_{j \in A_i} k_j \theta_j^{k_j} y_i^{k_j} \right)^2} \right)$$

An alternative example of using a discretized PDF is now described.

Instead of using a parametric PDF in (10), one can use a discretized.

The observed bandwidths are discretized into bins, and the appropriate bin for observation $y_i$ is denoted by $b_i$ and the corresponding bin centre is dented by $y\sim(b_i)$ (that is, a quantized $y_i$). One can the write (10) as:

$$\log p(y) = \sum_i \sum_{j \in A_i} \log \left( \tilde{\omega}_i p_j(b_i) + \sum_{k=b_i+1}^{K} \omega(k) p_j(k) \right) + \tag{22}$$

$$\sum_i \log \sum_{j \in A_i} \frac{p_j b_j}{\tilde{\omega}_i p_j(b_i) + \sum_{k=b_i+1}^{K} \omega(k) p_j(k)}$$

where K is the number of bins, w(k) is the width of the $k^{th}$ bin, and:

$$\tilde{\omega} = \tilde{y}(b_i) + \tfrac{1}{2}\omega(b_i) - y_i \tag{23}$$

is the distance from $y_i$ to the next bin. The $p_j(k)$ terms are the observation likelihood constants within each bin, and to constitute proper PDFs:

$$\forall j: \Sigma_{k=1}^{K} \omega(k) p_j(k) = 1 \tag{24}$$

$$\forall j,k: \ 0 \leq p_j(k) \leq 1 \tag{25}$$

If one applies equal bin sizes $\forall k: w(k) = w_0$, and moreover assumes that quantization is fine-grained so that $y\sim_i \approx y_i$, (22) reduces to:

$$\log p(y) = \sum_i \sum_{j \in A_i} \log(\omega_0) + \sum_i \sum_{j \in A_i} \log\left(\frac{1}{2}P_j(b_i) + \sum_{k=b_i+1}^{K} p_j(k)\right) + \quad (26)$$

$$\sum_i \log \sum_{j \in A_i} \frac{p_j(b_i)}{\frac{1}{2}p_j(b_i) + \sum_{k=b_i+1}^{K} p_j(k)} - \sum_i \log(\omega_0)$$

the maximum of which is independent of the bin size as expected.

Now note that both (22) and (26) can be vectorized as:

$$\log p(y) = c + \sum_i \sum_{j \in A_i} \log w_i^T p_j + \sum_i \log \sum_{j \in A_i} \frac{a_i^T p_j}{w_i^T p_j} \quad (27)$$

where $a_i$ pins the likelihood vector $p_j$ for the $b_i^{th}$ bin and $w_i$ is 0 for indexes below $b_i$ and—in the case of (26)—0.5 at $b_i$ and 1 above. The Jacobian can then be derived:

$$J(y, p) = \sum_i \sum_{j \in A_i} \frac{w_i}{w_i^T p_j} + \sum_i \frac{\sum_{j \in A_i} \frac{a_i w_i^T p_j - w_i a_i^T p_j}{(w_i^T p_j)^2}}{\sum_{j \in A_i} \frac{a_i^T p_j}{w_i^T p_j}} \quad (28)$$

$$= \sum_i (J_i^{(1)} + J_i^{(2)}) \quad (29)$$

One can also derive the Hessian. Using the same separation as for the Jacobian, one gets:

$$H_i^{(1)} = -\sum_{j \in A_i} \frac{w_i w_i^T}{(w_i^T p_j)^2} \quad (30)$$

and $$H_i^{(2)} = \frac{\sum_{j \in A_i} \left(2\frac{a_i^T p_j}{w_i^T p_j} w_i w_i^T - (a_i w_i^T + w_i a_i^T)/(w_i^T p_j)^2\right)}{\sum_{j \in A_i} \frac{a_i^T p_j}{w_i^T p_j}} - J_i^{(2)} J_i^{(2)T} \quad (31)$$

Here, it can be seen that $H_i^{(1)}$ is negative semi-definite but $H_i^{(2)}$ is not, and therefore the problem is not in general concave. That means it is not guaranteed that a convex optimization method will find the globally optimal parameters. Numeric experiments indicate however, that as long as the number of observations I is high relative to the number of network components J, the estimated parameters are indeed useable approximations to the optimal ones. One trick to ensure concavity could be to add Tikhonov regularization terms $-\alpha p_j^T p_j$ to the log-likelihood objective; as the Hessian of such terms is diagonal, it will subtract α from the eigenvalues of the Hessian, and thus concavity can be achieved by selecting α "high enough". An interpretation of this trick is that in the case where the problem is not concave, solution can be weighed towards the one with the high entropy.

Generally, any of the functionality described herein can be implemented using software, firmware, hardware (e.g., fixed logic circuitry), or a combination of these implementations. In the case of a software implementation, the functionality is implemented in program code embodied on a computer-readable medium or media, the code being configured to perform specified tasks when executed on one or more processors. One such computer-readable medium is signal bearing medium and thus is configured to transmit the instructions (e.g. as a carrier wave) to a computing device, such as via a network. Another computer-readable is a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the accompanying claims is not necessarily limited to the specific features or acts described above. Rather, the specific features and acts described above are disclosed as example forms of implementing the claims.

The invention claimed is:

1. A method comprising:
   estimating, by one or more computing devices, a component bandwidth or component bandwidth probability density of a plurality of individual network components based on a model that characterizes the network components using a bandwidth probability function;
   predicting, by the one or more computing devices, an end-to-end bandwidth or end-to-end bandwidth probability density of a target path over a network, based on the estimated component bandwidths or bandwidth probability densities of the plurality of individual constituent network components of the target path, the individual constituent network components of the target path not being included amongst observed individual constituent network components of end-end bandwidth experienced on different occasions by multiple past communications occurring over the network; and
   providing, by the one or more computing devices, the predicted end-to-end bandwidth or bandwidth probability density of the target path to a user terminal, for use as a prediction of a bandwidth or bandwidth probability density for a subsequent communication conducted by the user terminal over the target path.

2. The method of claim 1, wherein said past communications comprise user communications conducted between user terminals of multiple different users.

3. The method of claim 1, wherein the model that characterizes the network components using a bandwidth probability function models each of the respective individual constituent network components with the bandwidth probability function characterized by at least two independently variable parameters.

4. The method of claim 1, wherein the predicted end-to-end bandwidth or end-to-end bandwidth probability function of the target path is used to select a property of a subsequent communication being transmitted or to be transmitted over the target path, the selection of said property affecting a bandwidth incurred by the subsequent communication over the target path.

5. The method of claim 1, wherein each of said individual constituent network components is one of: a router, a relay, a server unit, a server, a data centre, an autonomous system number (ASN), or geographical meta information.

6. The method of claim 1, wherein the method further comprises:
predicting a respective end-to-end bandwidth or end-to-end bandwidth probability density of each of two or more different target paths over the network, each prediction being based on the component bandwidths or bandwidth probability densities of a respective plurality of said individual constituent network components; and
comparing the predicted end-to-end bandwidths or end-to-end bandwidth probability densities of the two or more target paths to the target path for transmitting the subsequent communication.

7. The method of claim 1, wherein the method is performed by a server.

8. A system comprising:
one or more processors; and
one or more computer-readable storage media storing instructions that are executable by the one or more processors to perform operations including:
estimating a component bandwidth of a plurality of individual network components based on a model that characterizes the network components using a bandwidth probability function;
predicting an end-to-end bandwidth of a target path over a network, based on the estimated component bandwidths of the plurality of individual constituent network components of the target path, the individual constituent network components of the target path not being included amongst individual constituent network components of observed paths; and
providing the predicted end-to-end bandwidth of the target path to a user terminal, for use as a prediction of a bandwidth for a subsequent communication conducted by the user terminal over the target path.

9. The system of claim 8, wherein said subsequent communication comprises user communications conducted between user terminals of multiple different users.

10. The system of claim 8, wherein the model that characterizes the network components using a bandwidth probability function models each of the respective individual constituent network components with a bandwidth characterized by at least two independently variable parameters.

11. The system of claim 8, wherein the predicted end-to-end bandwidth of the target path is used to select a property of a subsequent communication being transmitted or to be transmitted over the target path, the selection of said property affecting a bandwidth incurred by the subsequent communication over the target path.

12. The system of claim 8, wherein the system is performed by a server.

13. The system of claim 8, wherein the system is performed by a server, said communications comprise user communications conducted between user terminals of multiple different users, and further comprising a subsequent step of receiving back from the user terminals a measure of the bandwidth experienced by the subsequent communication over the target path, and at the server using said measure to refine the estimation of the individual constituent network component bandwidths.

14. The system of claim 8, wherein the instructions are further executable by the one or more processors to perform:
predicting a respective end-to-end bandwidth of each of two or more different target paths over the network, each based on the component bandwidths of a respective plurality of constituent ones of said individual constituent network components; and
a comparison of the predicted end-to-end bandwidths of the two or more target paths is used to select one of the target paths for transmitting a subsequent communication.

15. The system of claim 8, wherein each of said individual constituent network components is one of: a router, a relay, a server unit, a server, a data centre, an autonomous system number (ASN), or geographical meta information.

16. A computer-readable storage device having stored thereon computer-executable instructions for estimating bandwidth over a target path over a network, the instructions being executable to perform operations comprising:
estimating a component bandwidth probability density of a plurality of individual network components based on a model that characterizes the network components using a bandwidth probability function;
predicting an end-to-end bandwidth probability density of the target path, based on the estimated component bandwidth probability density of the plurality of individual constituent network components of the target path, the individual constituent network components of the target path not being included amongst individual constituent network components of observed paths of end-end bandwidth experienced on different occasions by multiple past communications occurring over the network; and
providing the predicted end-to-end bandwidth probability density of the target path to a user terminal, for use as a prediction of a bandwidth probability density for a subsequent communication conducted by the user terminal over the target path.

17. The computer-readable storage device of claim 16, wherein said past communications comprise user communications conducted between user terminals of multiple different users.

18. The computer-readable storage device of claim 16, wherein the predicted end-to-end bandwidth probability density of the target path is used to select a property of a subsequent communication being transmitted or to be transmitted over the target path, the selection of said property affecting a bandwidth incurred by the subsequent communication over the target path.

19. The computer-readable storage device of claim 16, wherein the model that characterizes the network components using a bandwidth probability function models each of the respective individual constituent network components with a bandwidth characterized by at least two independently variable parameters.

20. The computer-readable storage device of claim 16, wherein the instructions are further executable to perform operations comprising:
predicting a respective end-to-end bandwidth probability density of each of two or more different target paths over the network, each based on component bandwidth probability densities of a respective plurality of constituent ones of said individual constituent network components; and
performing a comparison of the predicted end-to-end bandwidth probability densities of the two or more target paths is used to select one of the target paths for transmitting a subsequent communication.

* * * * *